(12) United States Patent
Reinhardt

(10) Patent No.: US 8,390,617 B1
(45) Date of Patent: Mar. 5, 2013

(54) VISUALIZING OBLIQUE IMAGES

(75) Inventor: Tilman Reinhardt, Woodside, CA (US)

(73) Assignee: Google Inc., Mountain View, CA (US)

( * ) Notice: Subject to any disclaimer, the term of this patent is extended or adjusted under 35 U.S.C. 154(b) by 887 days.

(21) Appl. No.: 12/478,545

(22) Filed: Jun. 4, 2009

(51) Int. Cl.
*G06T 15/00* (2011.01)
(52) U.S. Cl. .................................. 345/419; 345/629
(58) Field of Classification Search .................. 345/419, 345/629
See application file for complete search history.

(56) References Cited

PUBLICATIONS

Zheng et al. "Scanning Scene Tunnel for City Traversing", IEEE Transactions on Visualization and Computer Graphics, vol. 12, No. 2, Mar./Apr. 2006, pp. 1, 161-164.*

Chen, Shenchang Eric, "Quicktime® VR—An Image-Based Approach to Virtual Environment Navigation", Computer Graphics, SIGGRAPH '95 Proceedings, pp. 29-38, Aug. 1995.

* cited by examiner

*Primary Examiner* — Maurice L McDowell, Jr.
(74) *Attorney, Agent, or Firm* — Sterne, Kessler, Goldstein and Fox, P.L.L.C.

(57) ABSTRACT

A method of visualizing images of a target in a 3D modeling system is provided, according to an embodiment. The method may include mapping and displaying one or more images, generated from respective viewpoints of the target, on a visualization frame that encompasses a representation of the target based upon respective viewpoints of the images. In another embodiment, the method may include determining relevant pixels in the images and cropping the images based upon the determination of relevant pixels. According to a further embodiment, the method may include enabling a user to control the orientation of the visualization frame to display the images of the target corresponding with a specific viewpoint. A system for visualizing images of a target in a 3D modeling system may include a mapping module, a frame controller, a cropping module and interface storage, according to another embodiment.

21 Claims, 6 Drawing Sheets

VISUALIZING OBLIQUE IMAGES

BACKGROUND

1. Field of the Invention

Embodiments of the present invention relate to computer graphics applications and 3D modeling.

2. Background Art

Computer graphics applications can render three-dimensional (3D) models representing real world objects. These real world objects can include geographical locations. Some locations can be large with many detailed features, including natural landmarks and man-made structures. Some graphics applications can model large portions of a city where buildings, structures and landmarks are modeled in a manner that is increasingly true to life.

A 3D model of a target object can be enhanced with multiple 2D images of the real object. Oblique images, or images taken at an angle oblique to the surface of the earth or target, may be obtained from various viewpoints around a target where the target is in view. For example, aerial pictures of city buildings and landmarks can be taken from different angles above a city. FIG. 1 shows a typical method 100 for collecting images of a city. An airplane 102 may fly over a city in a grid-like pattern shown by paths 104, 106 and 108. Various pictures of city features, such as buildings 110 and 112 may be taken from different viewpoints depending on the location of airplane 102 when the picture was taken.

Photographers may capture dozens of pictures for each of many targets. The images may be used to show certain geographical locations or to enhance 3D models of a location. For example, multiple images can be used to display the actual appearance of a building more clearly in a 3D model of a city block. However, there are often many oblique pictures of many targets, making it difficult for a graphics developer to maintain the spatial relationship between each target's 3D model and all the images taken from different viewpoints of the target.

In some cases, a single picture may contain multiple targets. This picture may be taken from a great distance while the 3D model is developed as if from a much closer distance. This difference in viewpoint distances can make it hard to visualize the relevant pixels of a target when zooming into a smaller geographical area. Further complicating this effort is the necessity of a developer to move around from viewpoint to viewpoint while enhancing the 3D models. These issues can cause users and developers to be less efficient and even overwhelmed.

BRIEF SUMMARY

Embodiments described herein refer to systems and methods for visualizing images of a target in a 3D modeling system. According to an embodiment, a method of visualizing images of a target in a 3D modeling system may include obtaining one or more images of a target, wherein each of the images is generated from a respective viewpoint of the target. These viewpoints may be external to or around the target so that the target is in view. The method may also include mapping the images on one or more surfaces of a visualization frame that encompasses a representation of the target based upon respective viewpoints of the images. The method may further include displaying the images on the visualization frame.

In another embodiment, the method may include determining relevant pixels in the images and cropping the images based upon the determination of relevant pixels. According to a further embodiment, the method may include enabling a user to control the orientation of the visualization frame to display the images of the target corresponding with a specific viewpoint.

According to an embodiment, a system for visualizing images of a target in a 3D model may include a mapping module configured to obtain one or more images of a target, wherein each of the images is generated from a respective viewpoint of the target. The mapping module may also be configured to map the images on one or more surfaces of a visualization frame that encompasses a representation of the target based upon respective viewpoints of the images.

According to another embodiment, the system may include a cropping module configured to determine relevant pixels in the images and crop the images based upon the determination of relevant pixels. In a further embodiment, the system may include a frame controller configured to enable a user to control an orientation of the visualization frame to display the images of the target corresponding with a specific viewpoint.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Real world objects can be modeled in 3D using computer graphics applications. A 3D model of a target object can be enhanced with multiple 2D images of the real object. Oblique images, or images taken at an angle oblique to the surface of the earth or target, may be obtained from various viewpoints around a target. However, there are often many pictures of many targets, making it difficult for a graphics developer to maintain the spatial relationship between each target's 3D model and all the images taken from different viewpoints of the target. Further complicating this effort is the necessity of a developer to move around from viewpoint to viewpoint while enhancing the 3D models. The volume of images, the various viewpoints of the images and the need to maneuver around different orientations can cause users and developers to be less efficient.

The goal of visualizing images of a target in a 3D modeling system is to assist developers in providing a more accurate depiction of a target represented by the 3D model. Aspects of the present invention can lead developers to be more efficient. Other users of graphics software can likewise benefit from visualizing target images in a 3D modeling system according to aspects of the invention.

Targets, as described herein, may include, but are not limited to, natural or man-made structures, landmarks, features, or products. Targets may be living or non-living. Targets may also be stationary or mobile. In some cases, targets may take on different appearances at different times. Often, as shown further herein, targets may include buildings in a city or portion of a city.

Figure 1:
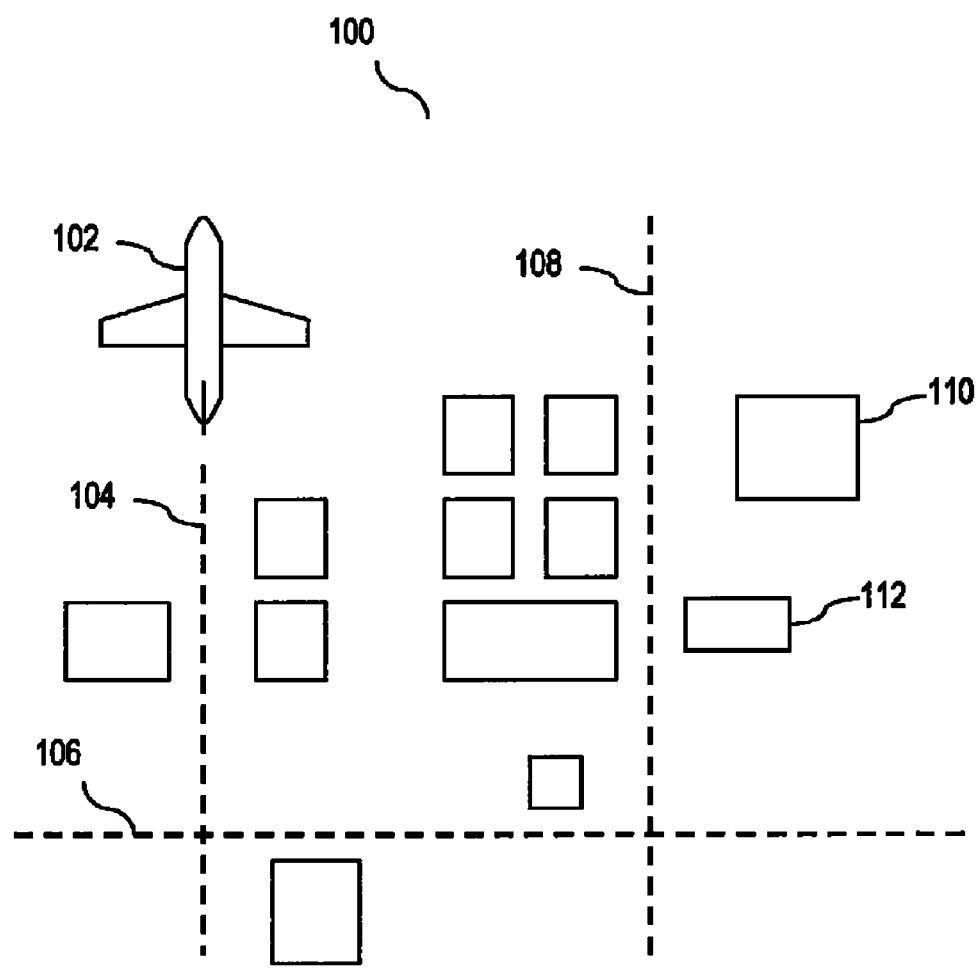
FIG. 1 is a diagram showing a typical method of collecting images.
Figure 2:
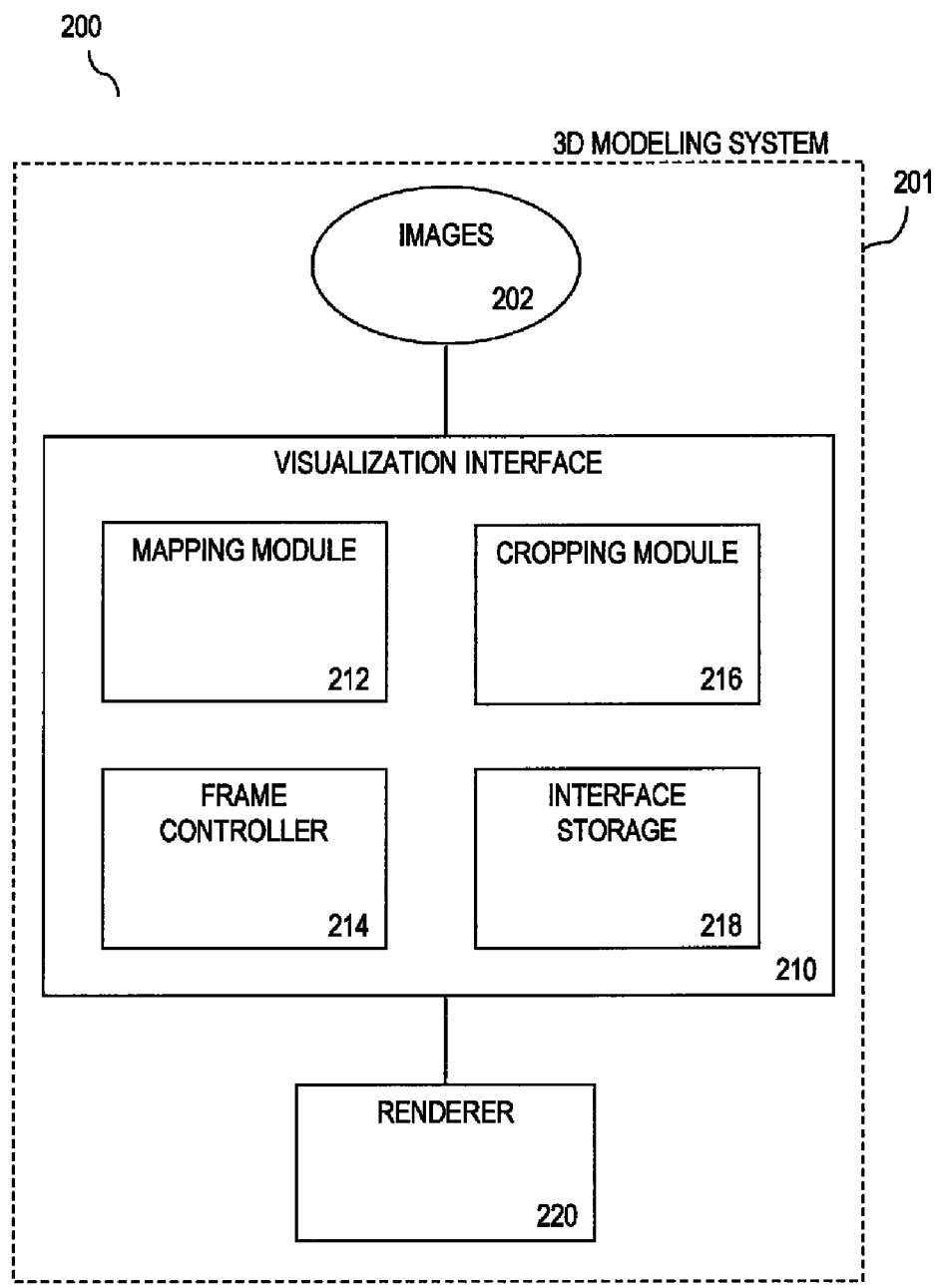
FIG. 2 is a diagram of a system for visualizing images of a target, according to an embodiment of the present invention.

According to an embodiment, FIG. 2 shows an exemplary system 200 for visualizing images for one or more targets in a 3D modeling system. Images 202 of one or more targets may be taken in various ways. In some cases, images 202 will be taken from an airplane 102 as described in method 100. Sometimes images 202 may be taken from a closer, ground level viewpoint of a target. Images 202 may be taken in any manner from any viewpoint. In other cases, images 202 may be collected from different sources. Some of these sources may include databases of existing images. Other sources may provide images 202 immediately or in real-time. Sources may also provide video. In some cases, images 202 may include video or clips of video, including aerial video.

Exemplary system 200 may be part of, or coupled to, a 3D modeling system, according to an embodiment. A 3D modeling system 201 can include any computer graphics software application executed by one or more computing devices that carries out 3D modeling. A computing device can be any type of computing device having one or more processors. For example, a computing device can be a workstation, mobile device (e.g., a mobile phone, personal digital assistant, or laptop), computer, server, compute cluster, server farm, game console, set-top box, kiosk, embedded system or other device having at least one processor and memory. Embodiments of the present invention may be software executed by a processor, firmware, hardware or any combination thereof in a computing device. According to a further embodiment, a 3D modeling system may include one or more databases, such as interface storage 218.

Graphics applications can be used to create representations of real world objects. The representations can be in three dimensions (3D). These 3D models can be similar in shape and relative size to the real world targets they represent. According to an embodiment, the 3D modeling system used by system 200 may include a graphics application that can use images 202 or portions of images 202 to enhance, or more accurately represent, a target modeled in 3D. It can be difficult for graphics application users to view many oblique images simultaneously with other images or models related to the images.

According to an embodiment, system 200 may include visualization interface 210. Visualization interface 210 may allow for the viewing, controlling and developing of 3D models. Images 202, or processed portions of images 202, may also be viewed and controlled with visualization interface 210. Visualization interface 210 may allow for 3D models to maintain their shape and relative position while being shifted, rotated or moved into another orientation. Different orientations of 3D models may represent different viewpoints of the target and surrounding targets. According to a further embodiment, visualization interface 210 may provide a number of tools and displays that enable a developer or user of the graphics application to perform various tasks.

Visualization interface 210 may be coupled to mapping module 212, according to an embodiment. Mapping module 212 may be configured to obtain one or more images 202 of a target, wherein each of the images 202 is generated from a respective viewpoint of the target. Mapping module 212 may be further configured to map one or more images 202 on one or more surfaces of a visualization frame. The visualization frame may encompass a representation of the target, according to an embodiment. The visualization frame may also be above the target, according to another embodiment. The visualization frame may be extended around the target. The visualization frame may be around a circumference of the target. The frame may also be around a perimeter of the target. In some cases, the frame may extend completely around a target as if encompassing it with a sphere or round polygon. According to an embodiment, the frame may be a hemisphere shape. In other cases, it may be a box, oval, pyramid, cone, polygon or other customized shape. In most cases, the frame is invisible. In other cases, the frame is merely a construct used by the program to control placement and movement of the images for display.

In one example, an image may be considered a frustum (pyramid). The apex of the pyramid may be the camera position extended through an image plane. This image plane may be moved to a distance from the camera position, changing the size of the image. This effect can be compared to a video projector projecting an image on a canvas. The further the canvas from the projector, the larger the image. An image may be considered to be placed at the intersection of the image frustum and a visualization frame. In other examples, an image may involve round shapes, polygon shapes or any other shapes.

The visualization frame may have one or more surfaces, according to an embodiment. The surfaces may be adjacent to each other. The surfaces may be on the external side of the visualization frame. There may be multiple layers of surfaces, above or beneath each other, according to another embodiment. According to a further embodiment, the surfaces may be partially transparent. The surfaces may also be invisible. According to another embodiment, the surfaces of a visualization frame may be virtual, or merely a vehicle used by the 3D modeling system for controlling the display and movement of images.

Figure 3:
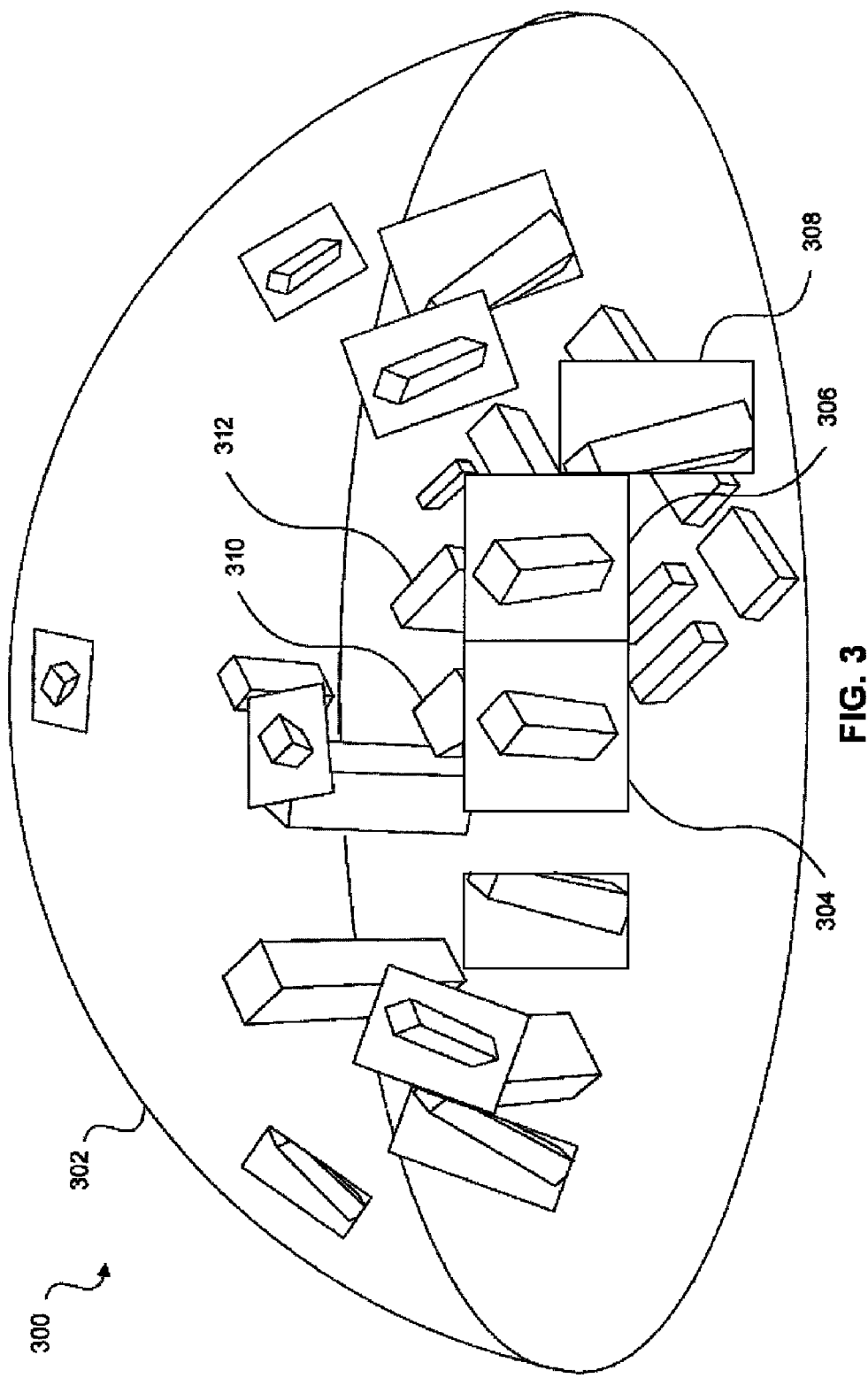
FIG. 3 is a diagram of a visualization frame for visualizing images of a target, according to an embodiment.

According to an embodiment, mapping module 212 may be configured to place selected images of images 202 onto surfaces of a visualization frame based upon the respective viewpoints from which the selected images were taken. For instance, images of a front of a building may be placed onto a front surface of a hemispheric frame extended out in front of a 3D model of the building. Respectively, an image of the roof of the building is placed on a top surface of the hemispheric frame, and an image of the side of the building is placed onto a side surface of the hemispheric frame. FIG. 3 shows an illustration of such an embodiment.

According to an embodiment, visualization interface 210 may be coupled to cropping module 216. Cropping module 216 may be configured to determine relevant pixels in an image and crop the image based upon the determination of relevant pixels. Relevant pixels may refer to pixels of an image pertaining to the target. For instance, relevant pixels in an image may be the pixels that show a target building while less relevant pixels may refer to the surrounding street and neighbor buildings. In some cases, relevant pixels may include the portions of the image immediately proximate to the target. This may provide some context for the target. In another embodiment, relevant pixels may include pixels pertaining to a second target. In a further embodiment, cropping module 216 may be configured to enable a user or developer to crop an image.

Some images may contain more pixels of a target than others. Images may be selected for placement on the visualization frame, according to an embodiment. Mapping module 216 may be configured to select images for display based upon an amount of relevant pixels in an image. These relevant pixels may be the pixels showing a target in an image. In a further embodiment, mapping module 216 may be configured to enable a user to select the images for display. According to an embodiment, images may be displayed with the assistance of renderer 220, which is coupled to visualization frame 210. In some cases, a boundary model may be laid over a representation of the target. This boundary can be used for picture alignment and for overlaying images onto the 3D model.

Visualization interface 210 may be coupled to frame controller 214, according to an embodiment. Frame controller 214 may be configured to enable a user to control an orientation of the visualization frame to display images of a target corresponding with a specific viewpoint. An orientation may include a view of 3D models and images of a target on a visualization frame based upon respective viewpoints. The 3D models and visualization frame may be viewed by a user from a particular viewpoint of one or more targets. According to an embodiment, controlling an orientation of the visualization frame may include rotating a visualization frame to display images from another viewpoint. As the 3D models are rotated, the visualization frame moves along with it, maintaining its position with respect to the modeled targets. A user may rotate the visualization frame clockwise or counterclockwise. In some cases, a visualization frame may be tilted up or down or left or right with respect to the user. In other cases, the frame can be rolled or maneuvered in any other way to show one or more perspectives of the targets and images.

Figure 5:
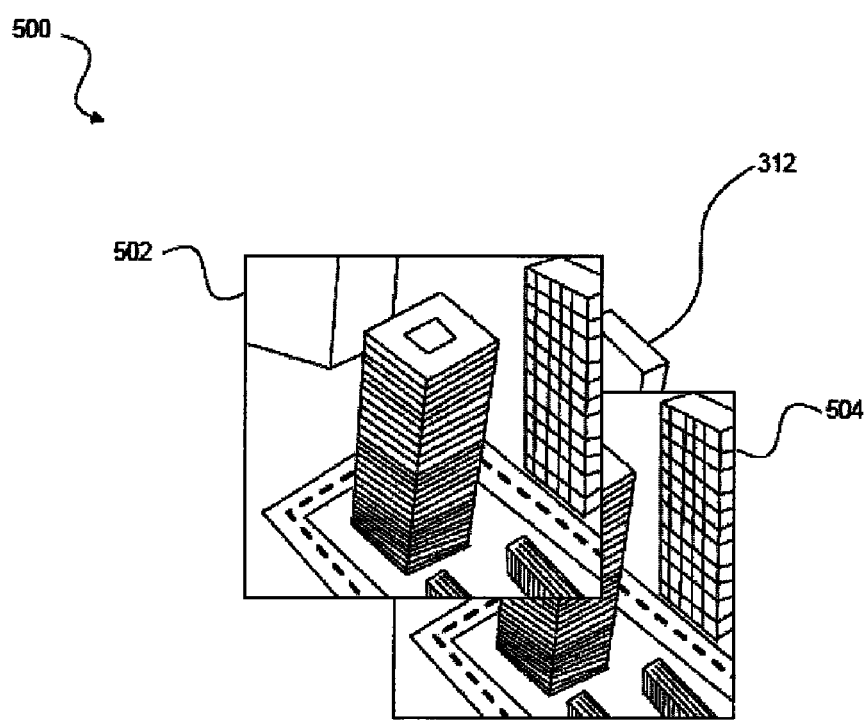
FIG. 5 is a diagram of an aligned image of a visualization frame for visualizing images of a target, according to an embodiment.

A visualization frame may be oriented to show images to a user or developer, according to an embodiment. Frame controller 214 may be configured to align at least one of the displayed images with the representation of the target with respect to a user viewpoint. According to another embodiment, frame controller 214 or mapping module 216 may be configured to overlay at least one of the displayed images onto the representation of the target with respect to a user viewpoint. FIG. 5 shows an alignment 500 which lays image 502 over 3D model 310 in proper position with respect to a viewpoint of a user, according to an embodiment. Overlapped image 504 and 3D model 312 are provided for context. 3D model 310 is not visible as it is directly underneath image 502.

Figure 4:
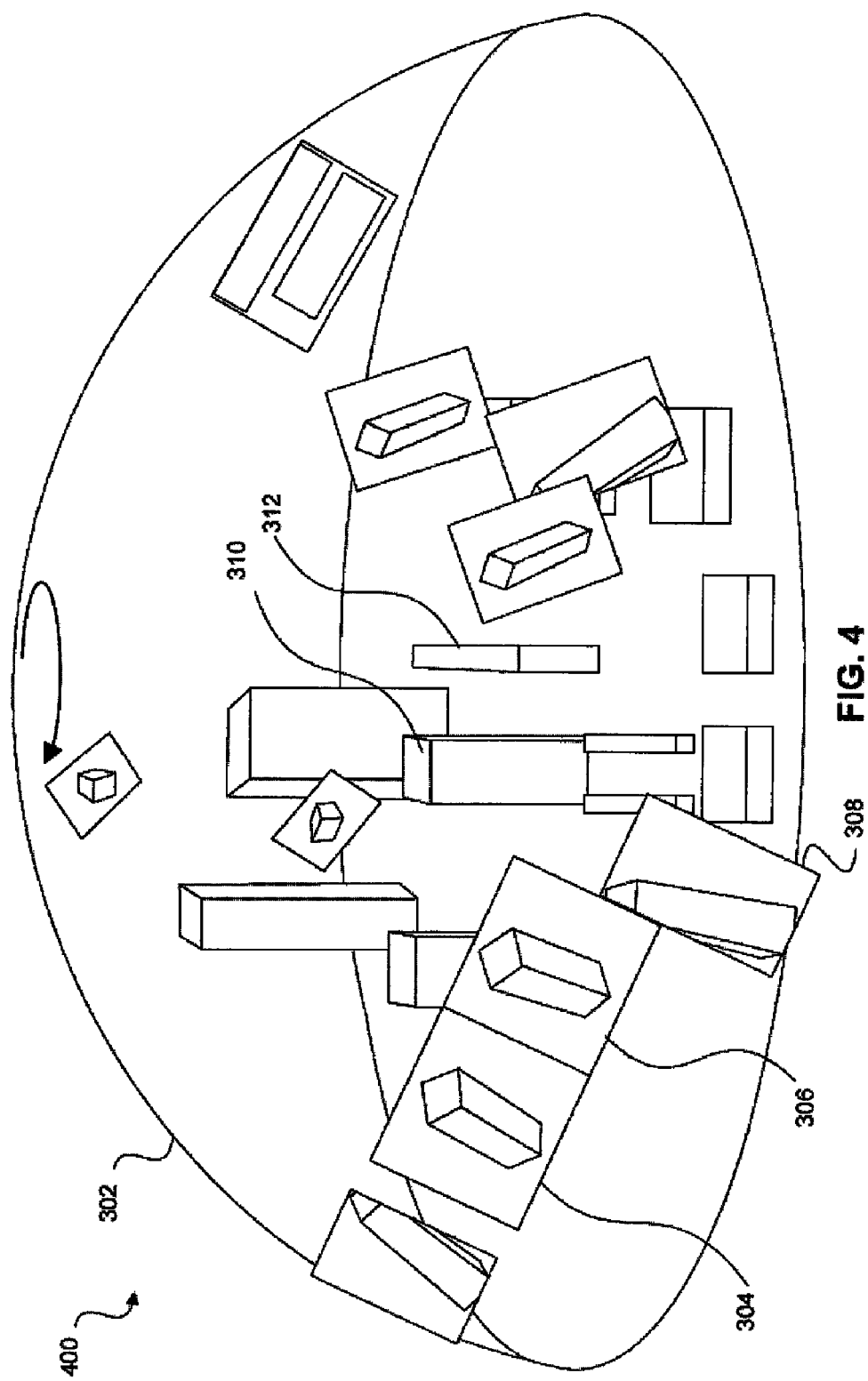
FIG. 4 is a diagram of a rotated visualization frame for visualizing images of a target, according to an embodiment.

Controlling the orientation of a visualization frame can be further explained using the illustrations of FIGS. 3 and 4. According to an embodiment, FIG. 3 illustrates an orientation 300 of a visualization frame 302. Images 304, 306 and 308 are mapped onto surfaces of visualization frame 302 according to respective viewpoints of a 3D model, such as 3D model 310. 3D model 310 may represent, for example, target building 110. Image 304 shows a picture of the bottom left-hand corner of a building represented by 3D model 310. It may be cropped from a larger picture of the building and the surrounding city. Image 306 shows a cropped picture of the bottom front and bottom right side of a building represented by 3D model 310. Image 308 shows another picture of the building taken from a closer viewpoint from in front of the building on the right hand side. Image 308 overlaps image 306 due to the viewpoint of the picture and how images 306 and 308 would align over 3D model 310 when viewed from a specific viewpoint. In some cases, visualization frame 302 and images 304, 306 and 308 may come into view upon selecting 3D model 310.

A developer can change viewpoints by rotating 3D models 310 and 312 and the accompanying visualization frame 302, according to an embodiment. For example, a developer may control an orientation of the framework using frame controller 214 in order to provide orientation 400, as shown in FIG. 4. Orientation 400 is a 45-degree clockwise rotation of visualization frame 302 from orientation 300. Accordingly, images 304, 306 and 308 rotate with frame 302. In some cases, images that move to the back of the hemispheric frame can be removed or deselected. Other images that were originally in the back may appear or become selected as they become mapped on the front 180 degrees of hemispherical frame 302. In rotating visualization frame 302 with images 304, 306 and 308 intact, a user has less chance of losing contextual awareness. This makes it fast and efficient to navigate between a large set of images that all show the same target. This productivity gain is more apparent when there are many more images than shown in FIGS. 3 and 4 According to other embodiments, visualization frame 302 may be tilted, shifted, reversed, or oriented in any other way necessary to view 3D objects and images.

Visualization frame 210 may be coupled to interface storage 218, according to an embodiment. Interface storage 218 may be configured to store an orientation of the visualization frame based upon selected relevant pixels corresponding with a specific viewpoint. A user may later return to this orientation in order to view the images positioned respective to a saved orientation. In other embodiments, interface storage 218 may also be configured to store images, 3D model information, user information and any other information used to assist a user or developer.

FIGS. 3 and 4 also show 3D model 312, which represents a second target, such as target building 112, according to an embodiment. Visualization interface 210 may be enabled to allow a user or developer to select another target for development. Mapping module 212 may be configured to map one or more images of a second target on one or more surfaces of a second visualization frame based upon respective viewpoints of the images. In this case, the second visualization frame encompasses a representation of the second target, or 3D model 312. This may occur prior to, simultaneously, or subsequent to the selection of the second target representation, or 3D model 312, for display. Renderer 220 may be used to display the images on the second visualization frame. In some cases, the images of the first visualization frame may be no longer be displayed as a result of showing the second visualization frame. In other cases, multiple visualization frames of varying sizes may be displayed simultaneously. It may be that some frames are more transparent or more visible than others based on a proximity to a user of visualization interface 210.

According to an embodiment, frame controller 214 may be configured to enable a user to control an orientation of the second visualization frame to display the images of the second target corresponding with a specific viewpoint. In some cases, the orientation of multiple frames can be controlled and changed while being displayed by renderer 220. Aspects of frame controller 214 can further assist a developer who may need to manage a number of images and viewpoints for many targets.

Figure 6:
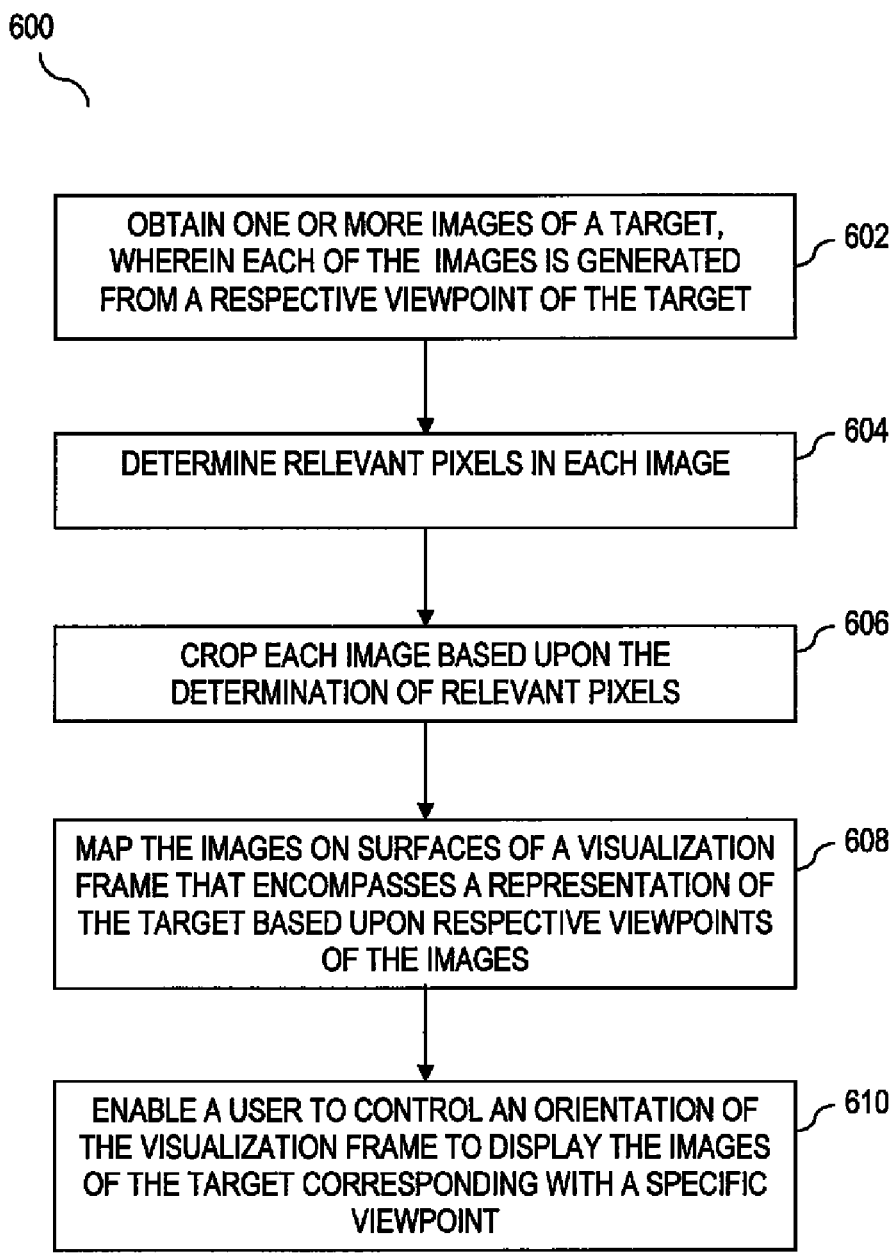
FIG. 6 is a flowchart illustrating a method for visualizing images of a target, according to an embodiment.

FIG. 6 is a flowchart illustrating an exemplary method 600 of visualizing images of a target in a 3D modeling system, according to an embodiment. Exemplary method 600 is used for purposes of illustration and shows a number of steps, some of which may occur in a different order or not at all. In step

602, images 202, which may have been taken from various viewpoints of a target, may be obtained. These images may be obtained from one or many sources. In some cases, the sources may be internal and/or external databases. In step 604, relevant pixels for each image may be determined. This may lead to some images being selected over other images for display. In an embodiment, this may be an automatic process. According to another embodiment, visualization interface 210 may be configured to enable a user to select images out of images 202. The selection may likely be determined based on the quality or amount of relevant pixels in an image. Selection may also be determined based upon contextual information surrounding a target. In step 606, each image may be cropped as necessary based upon the determination of relevant pixels. The cropping may be automatic based upon predetermined algorithms, according to an embodiment. In another embodiment, cropping module 216 may be configured to enable a user to crop selected images. In some cases, mapping images which have not been cropped may result in clutter or obstruction of 3D models. This could make use of a visualization frame less efficient.

In step 608, selected images may be mapped onto one or more surfaces of a visualization frame. The visualization frame may encompass a representation of the target in the 3D modeling system. A target may be represented by one or more 3D models. However, it is possible in some cases for the models to appear as 2D representations. The selected images will be displayed, using the visualization frame to keep the selected images in proper position relative to each other. In some cases, the visualization frame itself may or may not be visible with the images. In other cases, it is possible for parts of a frame to be visible using shading, lines or any other graphics which may help illustrate spatial relationships. However, if a frame is not visible, it may appear as if the images were projected or attached to surfaces of the frame.

It should be noted that mapping, selecting and cropping can take place in different orders. The images may cropped before or after mapping module 212 maps the images, according to an embodiment. It is also possible for images to be selected before or after mapping. Images may also be selected before or after cropping.

In step 610, a user may be enabled to control an orientation of the visualization frame to display the images of the target corresponding to a particular viewpoint. Other images from other viewpoints may be shown, but the image or images pertaining to the chosen viewpoint will be most prominent and may appear in front of the 3D model as to hide or place the 3D model directly behind the image. According to a further embodiment, a developer may further use a boundary box or boundary lines to further crop an image. As a result, the relevant pixels of an image showing the target, or building for instance, will remain on or associated with the 3D model. A 3D model of a building will now look like the building. Any contextual pixels not of the building may or may not remain. In some cases, images neighboring the target may be produced in a separate process.

According to an embodiment, developers can control an orientation of a visualization frame of mapped images to model geographical locations with greater efficiency. As a result, greater numbers of location features can be represented with true images. As more places are represented more accurately, users of graphics software will have a more enjoyable experience.

Although aspects of the invention can be used to model geographical locations, embodiments of the invention are not limited to geographical locations. Aspects of the invention can also be used in areas of manufacturing, engineering design, research, medicine, physics, biology, geology, astronomy, architecture, entertainment, sports, or any other field that involves imaging from various perspectives.

Aspects of the present invention, for exemplary systems 200-500 and/or method 600 or any part(s) or function(s) thereof may be implemented using hardware, software, firmware, tangible computer readable or computer usable storage media having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method implemented by at least one processor comprising:
    obtaining one or more images of a target, wherein each of the one or more images is generated from a respective viewpoint of the target, by the at least one processor;
    mapping the one or more images on one or more surfaces of a visualization frame that encompasses a representation of the target based upon respective viewpoints of the one or more images, by the at least one processor;
    displaying the one or more images on the visualization frame, by the at least one processor;
    enabling a user to control the orientation of the visualization frame to display the one or more images of the target corresponding with a specific viewpoint, by the at least one processor; and
    overlaying at least one of the displayed one or more images onto the representation of the target with respect to a user viewpoint, by the at least one processor.

2. The method of claim 1, further comprising storing the orientation of the visualization frame based upon the specific viewpoint.

3. A method implemented by at least one processor comprising:
    obtaining one or more images of a first target, wherein each of the one or more images of the first target is generated from a respective viewpoint of the first target, by the at least one processor;
    mapping the one or more images of the first target on one or more surfaces of a first visualization frame that encompasses a representation of the first target based upon respective viewpoints of the one or more images of the first target, by the at least one processor;

displaying the one or more images of the first target on the first visualization frame, by the at least one processor;

enabling a user to control the orientation of the first visualization frame to display the one or more images of the first target corresponding with a specific viewpoint, by the at least one processor;

obtaining one or more images of a second target, wherein each of the one or more images of the second target is generated from a respective viewpoint of the second target, by the at least one processor;

mapping one or more images of the second target on one or more surfaces of a second visualization frame that encompasses a representation of the second target based upon respective viewpoints of the one or more images of the second target, by the at least one processor;

hiding the one or more images of the first target of the first visualization frame, by the at least one processor;

displaying the one or more images of the second target on the second visualization frame, by the at least one processor; and enabling the user to control the orientation of the second visualization frame to display the one or more images of the second target corresponding with a specific viewpoint, by the at least one processor.

4. A method implemented by at least one processor comprising:

obtaining one or more images of a target, wherein each of the one or more images is generated from a respective viewpoint of the target, by the at least one processor;

mapping the one or more images on one or more surfaces of a visualization frame that encompasses a representation of the target based upon respective viewpoints of the one or more images, by the at least one processor;

displaying the one or more images on the visualization frame, by the at least one processor;

overlaying a boundary model over a representation of the target, by the at least one processor.

5. A method implemented by at least one processor comprising:

obtaining one or more images of a target, wherein each of the one or more images is generated from a respective viewpoint of the target, by the at least one processor;

mapping the one or more images on one or more external surfaces of a visualization frame that encompasses a representation of the target based upon respective viewpoints of the one or more images, by the at least one processor; and displaying the one or more images on the visualization frame, by the at least one processor.

6. A method implemented by at least one processor comprising:

obtaining one or more images of a target, wherein each of the one or more images is generated from a respective viewpoint of the target, by the at least one processor;

mapping the one or more images on one or more surfaces of a visualization frame that encompasses a representation of the target based upon respective viewpoints of the one or more images, by the at least one processor;

displaying the one or more images on the visualization frame, by the at least one processor;

determining relevant pixels in the one or more images, by the at least one processor;

cropping the one or more images based upon the determination of relevant pixels, by the at least one processor.

7. The method of claim 6, wherein determining relevant pixels includes determining pixels of the target.

8. The method of claim 6, wherein determining relevant pixels includes determining pixels of a second target.

9. The method of claim 6, further comprising enabling a user to control an orientation of the visualization frame to highlight relevant pixels corresponding with a specific viewpoints.

10. The method of claim 9, wherein enabling includes enabling a user to control an orientation of the visualization frame to highlight a building and one or more features of the building.

11. A method implemented by at least one processor comprising:

obtaining one or more images of a target, wherein each of the one or more images is generated from a respective viewpoint of the target, by the at least one processor;

mapping the one or more images on one or more surfaces of a visualization frame that encompasses a representation of the target based upon respective viewpoints of the one or more images, by the at least one processor;

displaying the one or more images on the visualization frame, by the at least one processor; and enabling a user to select one or more dimensions of the visualization frame, by the at least one processor.

12. A method implemented by at least one processor comprising:

obtaining one or more images of a target, wherein each of the one or more images is generated from a respective viewpoint of the target, by the at least one processor;

mapping the one or more images on one or more surfaces of a visualization frame that encompasses a representation of the target based upon respective viewpoints of the one or more images, by the at least one processor;

displaying the one or more images on the visualization frame, by the at least one processor; and enabling a user to select which of the one or more mapped images will be displayed for a specific viewpoint based upon an amount of the target in the one or more images, by the at least one processor.

13. The method of claim 12, wherein enabling includes enabling a user to control an orientation of the visualization frame to highlight a building based upon an amount of the building visible in an image.

14. A system comprising:

a mapping module implemented with one or more processors and configured to:

obtain one or more images of a first target, wherein each of the one or more images of the first target is generated from a respective viewpoint of the first target;

map the one or more images of the first target on one or more surfaces of a first visualization frame that encompasses a representation of the first target based upon respective viewpoints of the one or more images of the first target;

obtain one or more images of a second target, wherein each of the one or more images of the second target is generated from a respective viewpoint of the second target;

map one or more images of the second target on one or more surfaces of a second visualization frame that encompasses a representation of the second target based upon respective viewpoints of the one or more images of the second target; and a frame controller configured to:
  enable a user to control an orientation of the first visualization frame to display the one or more images of the first target corresponding with a specific viewpoint, and
  enable the user to control the orientation of the second visualization frame to display the one or more images of the second target corresponding with a specific viewpoint.

15. A system comprising:
a mapping module implemented with one or more processors and configured to:
  obtain one or more images of a target, wherein each of the one or more images is generated from a respective viewpoint of the target; and
  map the one or more images on one or more surfaces of a visualization frame that encompasses a representation of the target based upon respective viewpoints of the one or more images; and
a frame controller configured to:
  enable a user to control an orientation of the visualization frame to display the one or more images of the target corresponding with a specific viewpoint; and
  overlay at least one of the displayed images onto the representation of the target with respect to a user viewpoint.

16. A system comprising:
a mapping module implemented with one or more processors and configured to:
  obtain one or more images of a target, wherein each of the one or more images is generated from a respective viewpoint of the target; and
  map the one or more images on one or more surfaces of a visualization frame that encompasses a representation of the target based upon respective viewpoints of the one or more images:
a frame controller configured to:
  enable a user to control an orientation of the visualization frame to display the one or more images of the target corresponding with a specific viewpoint; and
an interface storage configured to:
  store an orientation of the visualization frame based upon selected relevant pixels corresponding with the specific viewpoint.

17. A system comprising:
a mapping module implemented with one or more processors and configured to:
  obtain one or more images of a target, wherein each of the one or more images is generated from a respective viewpoint of the target; and
  map the one or more images on one or more surfaces of a visualization frame that encompasses a representation of the target based upon respective viewpoints of the one or more images; and
a cropping module configured to:
  determine relevant pixels in the one or more images; and
  crop the one or more images based upon the determination of relevant pixels.

18. The system of claim 17, wherein the relevant pixels include pixels of the target.

19. The system of claim 17, wherein the relevant pixels include pixels of a second target.

20. A system comprising:
a mapping module implemented with one or more processors and configured to:
  obtain one or more images of a target, wherein each of the one or more images is generated from a respective viewpoint of the target; and
  map the one or more images on one or more surfaces of a visualization frame that encompasses a representation of the target based upon respective viewpoints of the one or more images:
a frame controller configured to:
  control an orientation of the visualization frame to highlight relevant pixels corresponding with a specific viewpoint.

21. The system of claim 20, wherein the target is a building and the relevant pixels represent one or more surfaces of the building.

\* \* \* \* \*